INVENTOR.
GUSTAV K. MEDICUS

United States Patent Office 3,120,373
Patented Feb. 4, 1964

3,120,373
LEAKPROOF VACUUM VALVE
Gustav K. Medicus, 7521 W. Hyland, Dayton 24, Ohio
Filed Nov. 28, 1962, Ser. No. 240,763
7 Claims. (Cl. 251—124)
(Granted under Title 35, U.S. Code (1952), sec. 266)

The invention described herein may be manufactured and used by or for the Government for governmental purposes without the payment to me of any royalty thereon.

This invention relates to shut-off valves and, more particularly, to shut-off valves used in high vacuum apparatus.

A great many types of vacuum apparatus, such as used in a laboratory, for example, are connected to vacuum pumps for evacuation. After evacuation, it is often desirable to disconnect the pump from the balance of the apparatus. Usually a shut-off cock is provided for this purpose.

A very common form of shut-off cock is made of glass. Such a cock has a tapered plug rotatable in a glass body. In order to be even reasonably tight, the plug must very acurately fit the mating surface within the body. This construction results in a rotatable plug having a large bearing area which often causes the plug to freeze in the body. Such cocks in high vacuum application are never free of some leakage from the atmosphere.

Various methods have been used in attempts to solve the dual problem of sticking and leaking. Almost without exception, the bearing surface in the cock is greased to prevent freezing and as an attempt to seal the leakage passages.

The use of grease, however, in turn introduces new problems and disadvantages. Since the plug is made to very accurately fit the body, the grease tends to work out of the body, thus leaving the bearing surface dry and leakable. Furthermore, the grease tends to enter and plug the passages against the normally small pressure differential across the plug. A further and even more serious disadvantage of using grease is that the grease comes into contact with the interior of the apparatus to contaminate the environment within the apparatus.

The primary object of this invention is to substitute a simple and reliable plug valve for the troublesome shut-off cock usually employed to disconnect the vacuum pump after evacuation of vacuum apparatus.

Another object of this invention is to provide a valve, which when used in a high vacuum application, is completely sealed against leakage and contamination from the ambient atmosphere.

A further object of this invention is to provide a valve which requires no lubricants.

Yet another object of this invention is to provide a valve in which the sealing surfaces are directly separable to eliminate rotatable bearing surfaces between the sealing elements.

Yet another object of this invention is to provide a valve for use on vacuum apparatus which will not stick in use.

Additional objects, advantages and features of the invention reside in the construction, arrangement and combination of parts involved in the embodiments of the invention as will appear from the following description and accompanying drawings wherein.

Figure 1:
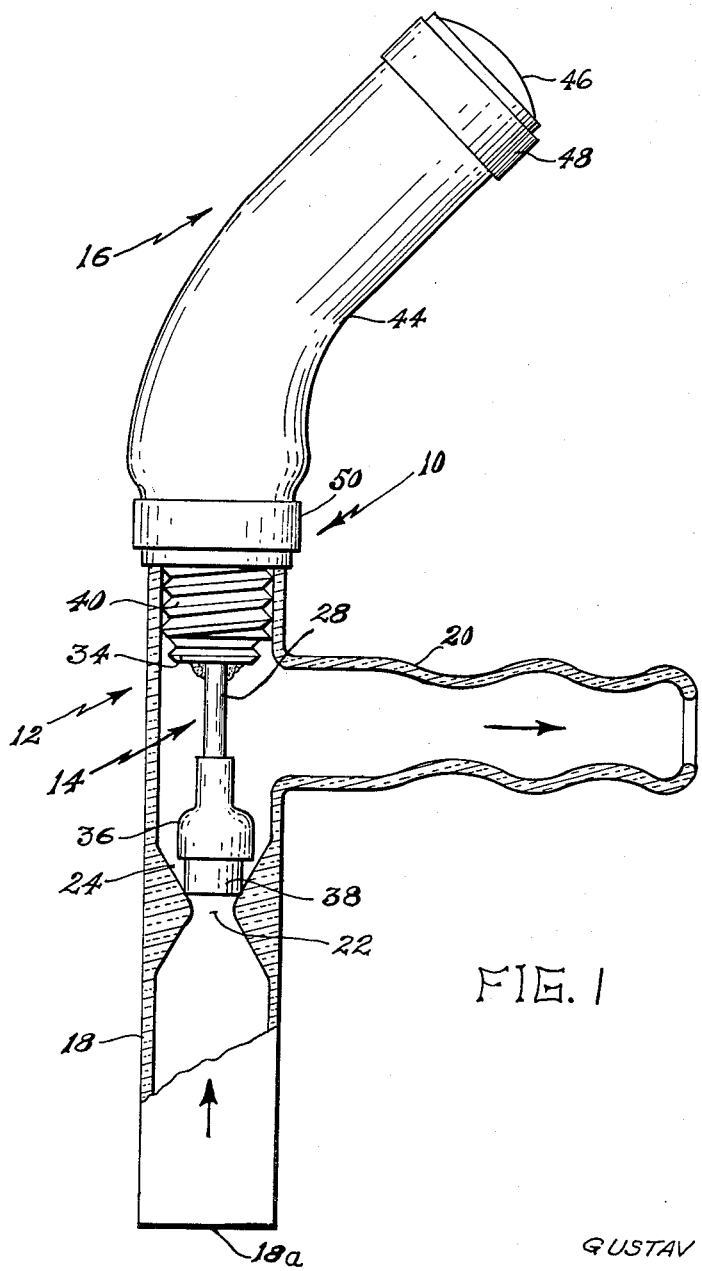
FIG. 1 is an elevation of one embodiment of the invention, partially in section, and having a glass body.
Figure 2:
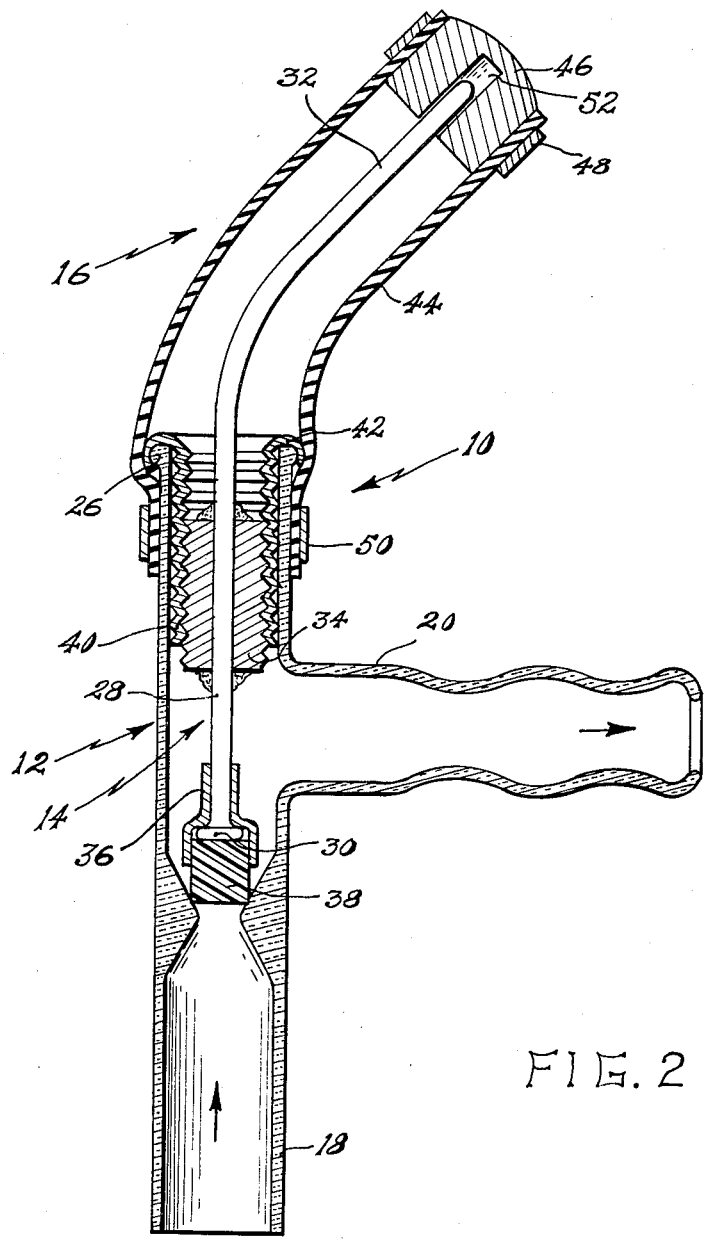
FIG. 2 is a full sectional elevation of the embodiment shown on FIG. 1.

Referring to FIG. 1 and FIG. 2, the valve referred to generally as valve 10, comprises in its more essential elements, a body 12, a valve plug assembly 14 and a flexible boot or cot 16, the open end of which is joined to the body.

Body 12, which preferably is in the T-form shown, has a vertical tube 18 and a side tube 20, joined thereto. In use, the valve body is installed in the proper flow line of the apparatus. The body is preferably of glass, but may be of plastic or other suitable nonmetallic material chemically inert to its applied environment. It may be optionally built with square cut openings as shown by 18a; in which case, the valve, if having a glass body, may be fused into a glass flow line or brazed into a metallic flow line if made of metal, or it may have fluted connections as shown on side tube 20. If fluted connections are used, the valve would be installed into the flow line by means of hoses and hose clamps in the conventional manner.

Within the vertical tube 18 of body 12 is a venturi shaped passage 22, the upper conical wall 24 of which forms the seat of the valve. The upper end of vertical tube 18 terminates in an opening having an external reinforcing rim 26, the purpose of which will be explained hereinafter.

Referring in particular to the valve plug assembly 14, the assembly comprises a bent rod 28; the lower end of which has a button head 30, and the upper end of which forms the actuating handle 32. Joined to the bent rod 28 by brazing or welding as shown, for example, is a threaded collar 34. At the lower end of the valve plug assembly is sleeve 36 which is rotatable on rod 28. The enlarged diameter portion of sleeve 36 receives under restraint, a valve plug 38 made of a resilient material such as nylon or Teflon. The upper end of plug 38 engages the lower face of button head 30.

The valve plug assembly 14 may easily be assembled by taking a straight rod 28, sliding sleeve 36 in place, sliding the threaded collar 34 in place and welding, bending the rod to form the operating handle 32 and, finally, inserting valve plug 38.

A threaded sleeve 40 may be spun from copper or brass tubing to have threads matching the threads on the threaded collar 34. The threaded sleeve 40 is provided with a flange 42 which is crimped around the enlarged rim 26 of body 12 as shown on FIG. 2. It is noted that, with the sleeve crimped in place, it is the operable equivalent of having threads formed in the valve body.

The flexible boot or cot 16, may be conveniently formed of a flexible metallic hose or a piece of rubber or synthetic rubber tubing 44, one end of which is plugged with end plug 46 held in place by clamping band 48, and having the opposite end held in place on body 12 by means of clamping band 50. The end plug 46 contains a bore 52 for rotatably receiving and guiding the end of actuating handle 32.

In operation, the actuating handle may easily be rotated within the flexible boot which has a wobbling motion. The valve may be mounted for either direction of flow. In vacuum applications, however, it would be preferable to have the vacuum pump located to produce flow in the direction indicated on the drawings. On shut-down of the vacuum pump with the valve closed, any leakage through the pump with ensuing pressure rise would hold the valve plug more firmly against the seat.

Figure 3:
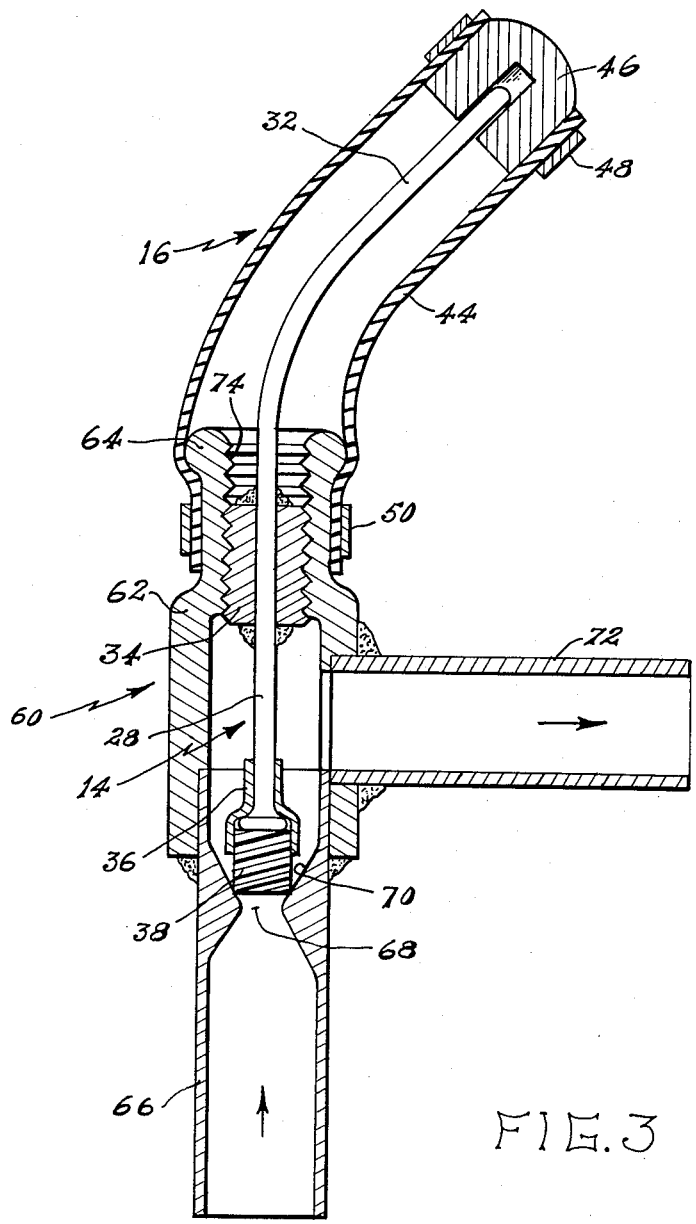
FIG. 3 is a full sectional elevation, similar to FIG. 2, of another embodiment of the invention having a metal body.

Another embodiment of the invention, in which like elements have like numbers, is shown on FIG. 3. The valve body assembly in this embodiment is made of metal.

The valve body assembly 60 has a major vertical body portion 62, necked down to provide an enlarged rim 64 similar to the enlarged rim 26 of the embodiment shown on FIG. 2. The vertical portion 62 is axially bored and counterbored at the end opposite the enlarged rim 64 to receive seat tube 66 which may be brazed in place as shown. Seat tube 66 contains a venturi shaped passage 68, the upper conical wall 70 of which forms the seat of the valve. Passage 68 which is formed in seat tube 66 for ease of machining, may be formed in the major vertical portion 62 of the valve body without departing from the invention. The end of the major vertical portion 62 having the enlarged rim 64 is internally threaded with threads 74 to engage the threaded collar of the valve plug assembly 14. A side tube 72 having a flow passage communicating with the bore in the vertical portion of the valve body above conical wall 70 is brazed in place as shown. In use, the valve may be brazed or otherwise joined to the proper flow line.

While preferred forms of the invention have been shown and described, various modifications and substitutions of equivalents will occur to those skilled in the art after a study of the foregoing disclosure. Hence, the disclosure should be taken in an illustrative rather than in a limiting sense; and it is the desire and intent to reserve all modifications within the scope of the appended claims.

I claim:

1. A valve comprising: a body having an inlet passage, an outlet passage at an angle to said inlet passage, and a venturi shaped flow passage coaxial with said inlet passage and between said inlet and said outlet passage; a valve plug assembly in threaded engagement within said body on the axis through said venturi shaped flow passage and having a non-metallic valve plug on an inner end for opening and closing against a conical wall of said venturi shaped flow passage and having an outer end bent at an angle to said axis for providing an actuating handle; and a flexible leak-proof cot surrounding the actuating handle of said valve plug assembly and having an open end joined to said body thereby preventing leakage between said body and said valve plug assembly.

2. A valve comprising: a body containing a venturi shaped passage contained in and coaxial within a linear passage through said body, one end of said linear passage forming a first flow passage, and a second flow passage at an angle to and communicating with said linear passage on the side of said venturi shaped passage opposing said first flow passage; a valve plug assembly having a threaded collar threadably engaging said linear passage through said body at the end opposing said first flow passage and having a nonmetallic valve plug on an inner end for opening and closing against a conical wall of said venturi shaped flow passage and having an outer end bent to provide an actuating handle; and a flexible leak-proof boot encasing the actuating handle of said valve plug assembly and having an open end joined to said body thereby preventing leakage between the atmosphere and the passages in said valve body.

3. A valve comprising: a body containing a venturi shaped passage contained in and coaxial within a linear passage through said body, one end of said linear passage forming a first flow passage, and a second flow passage at an angle to and communicating with said linear passage on the side of said venturi shaped passage opposing said first flow passage; a valve plug assembly having a threaded collar threadably engaging said linear passage through said body at the end opposing said first flow passage and having a sleeve rotatable at an inner end of said valve plug assembly and supporting a nonmetallic plug for opening and closing against a conical wall of said venturi shaped flow passage, an opposite end of said valve plug assembly being at an angle with the axis through said linear passage in said body to provide an actuating handle; and a flexible leak-proof boot encasing the actuating handle of said valve plug assembly, said boot having guide means at a closed end for guiding the end of said operating handle on said valve plug assembly and having an open end joined to said body thereby preventing leakage between the atmosphere and the passages in said valve body.

4. A valve comprising: an integral nonmetallic body containing a venturi shaped passage contained in and coaxial within a linear passage through said body, one end of said linear passage forming a first flow passage, and a second flow passage at an angle to and communicating with said linear passage on the side of said venturi shaped passage, opposing said first flow passage; a metallic threaded sleeve within the said linear passage through said body at the end opposing said first flow passage and having means thereon joining said sleeve to said body; a valve plug assembly having a threaded collar engaging said metallic threaded sleeve and having a nonmetallic valve plug on an inner end for opening and closing against a conical wall of said venturi shaped flow passage and having an outer end bent to provide an actuating handle; and a flexible leakproof boot encasing the actuating handle of said valve plug assembly and having an open end joined to said body thereby preventing leakage between the atmosphere and the passages in said valve body.

5. A valve comprising: an integral glass body containing a venturi shaped passage contained in and coaxial within a linear passage through said body, one end of said linear passage forming a first flow passage and the opposite end terminating in an end having an external reinforcing rim, and a second flow passage at an angle to and communicating with said linear passage on the side of said venturi shaped passage opposing said first flow passage; a metallic threaded sleeve within the said linear passage through said body at the end terminating with the external reinforcing rim, said sleeve having an external flange crimped around the reinforcing rim for joining said sleeve to said body; a valve plug assembly having a threaded collar engaging said metallic threaded sleeve and having a sleeve rotatable at an inner end of said valve plug assembly and supporting a nonmetallic plug for opening and closing against a conical wall of said venturi shaped flow passage, an opposite end of said valve plug assembly being at an angle with the axis through said linear passage in said body to provide an actuating handle; and a flexible leak-proof boot encasing the actuating handle of said valve plug assembly, said boot having guide means at a closed end for guiding the end of said operating handle on said valve plug assembly and having an open end joined to said body thereby preventing leakage between the atmosphere and the passages in said valve body.

6. A valve comprising: a metallic body containing a venturi shaped passage contained in and coaxial within a linear passage through said body, one end of said linear passage forming a first flow passage and the opposite end terminating in an internally threaded end, and a second flow passage at an angle to and communicating with said linear passage on the side of said venturi shaped passage opposing said first flow passage; a valve plug assembly having a threaded collar engaging the threaded end of said body and having a nonmetallic valve plug on an inner end for opening and closing against a conical wall of said venturi shaped flow passage and having an outer end bent to provide an actuating handle; and a flexible leak-proof boot encasing the actuating handle of said valve plug assembly and having an open end joined to said body thereby preventing leakage between the atmosphere and the passages in said valve body.

7. A valve comprising: a valve body assembly, a valve plug assembly and a flexible boot; said valve body assembly comprising a major body portion containing a linear passage therethrough, said linear passage being internally threaded on one end and counterbored on the opposite end, a seat tube containing a venturi shaped flow passage and having one end inserted into the counterbore and joined to said major body portion and having the opposite end forming a first flow passage, and a side tube having a flow passage joined to said major body portion at an angle to said linear passage through said major body portion and having the flow passage in said side tube forming a second flow passage on the opposite side of said venturi shaped passage from said first flow passage; said valve plug assembly having a threaded collar engaging the threaded portion of said valve body assembly and having a sleeve rotatable at an inner end of said valve plug assembly and supporting a nonmetallic plug for opening and closing against a conical wall of said venturi shaped flow passage, an opposite end of said valve plug assembly being at an angle with the axis through the linear passage in said valve body assembly to provide an actuating handle; and a flexible leak-proof boot encasing the actuating handle of said valve plug assembly, said boot having guide means at a closed end for guiding the end of said operating handle on said valve plug assembly and having an open end joined to said body thereby preventing leakage between the atmosphere and the passages in said valve body assembly.

References Cited in the file of this patent

UNITED STATES PATENTS

| | | |
|---|---|---|
| 1,007,554 | Glauber | Oct. 31, 1911 |
| 1,937,313 | Brotz | Nov. 28, 1933 |
| 2,281,417 | Darby | Apr. 28, 1942 |
| 2,891,570 | Krupp | June 23, 1959 |

FOREIGN PATENTS

| | | |
|---|---|---|
| 26,576 | Netherlands | May 17, 1932 |